United States Patent
Lee et al.

(10) Patent No.: US 8,035,690 B2
(45) Date of Patent: Oct. 11, 2011

(54) APPARATUS AND METHOD FOR ESTIMATING MOTION DUE TO HAND TREMBLING AND IMAGE PICKUP DEVICE USING THE SAME

(75) Inventors: Chang-woo Lee, Suwon-si (KR); Yoon-cheol Shin, Seoul (KR); Dong-bum Choi, Suwon-si (KR); Tae-wook Nam, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 12/045,837

(22) Filed: Mar. 11, 2008

(65) Prior Publication Data
US 2009/0051777 A1    Feb. 26, 2009

(30) Foreign Application Priority Data
Aug. 20, 2007  (KR) ................ 10-2007-0083449

(51) Int. Cl.
*H04N 5/228* (2006.01)
(52) U.S. Cl. ............... 348/208.3; 348/208.6; 348/208.1; 396/55
(58) Field of Classification Search .......... 348/208.3, 348/208.6, 352
See application file for complete search history.

(56) References Cited

U.S. PATENT DOCUMENTS

| 5,107,293 A * | 4/1992 | Sekine et al. ........... 396/55 |
| 5,561,498 A | 10/1996 | Sekine et al. |
| 5,909,242 A | 6/1999 | Kobayashi et al. |
| 6,707,854 B1 | 3/2004 | Bonnet et al. |
| 6,734,901 B1 * | 5/2004 | Kudo et al. ........... 348/208.4 |
| 7,050,500 B2 | 5/2006 | Sun et al. |
| 2004/0001147 A1 * | 1/2004 | Vella et al. ........... 348/208.99 |
| 2004/0027454 A1 | 2/2004 | Vella et al. |
| 2004/0057520 A1 | 3/2004 | Sun |
| 2006/0044404 A1 * | 3/2006 | Hatanaka ........... 348/208.4 |
| 2006/0152590 A1 * | 7/2006 | Kage et al. ........... 348/208.1 |
| 2006/0152604 A1 * | 7/2006 | Ishikawa ........... 348/240.99 |
| 2006/0232681 A1 | 10/2006 | Okada |

(Continued)

FOREIGN PATENT DOCUMENTS

| CN | 1759600 A | 4/2006 |
| CN | 1791221 A | 6/2006 |
| EP | 0358196 B1 | 7/1997 |
| EP | 1377040 A1 | 1/2004 |

(Continued)

OTHER PUBLICATIONS

Vella F. et. al.: "Robust digital image stabilization algorithm using block motion vectors" IEEE Transactions on Consumer Electronics, IEEE Service Center, New York, NY, US LNKD-D0I:10.1109/ICCE.2002.1014008, Jun. 18, 2002, pp. 234-235, XP002215391 ISSN: 0098-3063.

(Continued)

*Primary Examiner* — Sinh Tran
*Assistant Examiner* — Paul Berardesca
(74) *Attorney, Agent, or Firm* — Sughrue Mion, PLLC

(57) ABSTRACT

A motion estimation apparatus and method for estimating a global motion vector of an image due to hand trembling by using zoom information and focus information are provided. The motion estimation method includes: dividing a photographed image into a plurality of image blocks; determining a weight value for a motion vector of each of a plurality of image blocks based on focus information and zoom magnification information; predicting a motion vector for each image block; and estimating a global motion by applying the weight value determined for the motion vector for each image block to the predicted motion vector.

15 Claims, 7 Drawing Sheets

U.S. PATENT DOCUMENTS

2007/0019937 A1* 1/2007 Endo ................................ 396/52
2007/0195172 A1* 8/2007 Kurata ..................... 348/208.99

FOREIGN PATENT DOCUMENTS

| RU | 2197070 C2 | 1/2003 |
| RU | 2308816 A | 9/2011 |
| WO | 2005/064919 A1 | 7/2005 |

OTHER PUBLICATIONS

Extended European search report dated Sep. 15, 2010, issued by the European Patent Office in counterpart European Application No. 08153979.3-2202.

Communication dated Sep. 14, 2010, issued by the Russian Patent Office in counterpart Russian Application No. 2010106087.

Communication from the Russian Patent Office issued on Apr. 26, 2011 in counterpart Russian Patent Application No. 2010106087.

Vella, F. et., al. "Digital Image Stabilization by Adaptive Block Motion Vectors Filtering", IEEE Transactions on Consumer electronics, vol. 48, Issue 3, Aug. 2002, 6 pages.

Communication dated Jun. 22, 2011 from the State Intellectual Property Office of P.R. China in counterpart Chinese application No. 200880022269.2.

\* cited by examiner

APPARATUS AND METHOD FOR ESTIMATING MOTION DUE TO HAND TREMBLING AND IMAGE PICKUP DEVICE USING THE SAME

CROSS-REFERENCE TO RELATED PATENT APPLICATIONS

This application claims priority from Korean Patent Application No. 10-2007-0083449, filed on Aug. 20, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to motion estimation in an image pickup apparatus, and more particularly, to estimating a global motion vector of an image due to hand trembling by using zoom information and focus information.

2. Description of the Related Art

Most moving picture processing techniques use a motion compensation approach to estimate only a motion of a local object appearing between neighboring frames. This motion is referred to as a local motion. However, in actual moving pictures, motion in addition to the local motion, such as a zoom motion, a pan motion, and rotation of a camera, affects the whole image. This motion affecting the whole image is referred to as global motion. In general, an image pickup device such as a camera or a camcorder uses a global motion detection method to adjust the position of a frame.

In such an image pickup device, the spatial position of an image changes over time due to hand trembling and nearby vibrations.

In general, in an image obtained through a moving camera, the motion of the background and the motion of an object exist at the same time, and therefore the global motion is calculated in each image, thereby detecting the motion of the object.

In a related art method of estimating a global motion vector, it is difficult to find a global motion vector because of a zoom magnification provided by an image pickup device.

FIG. 1A illustrates an image photographed when a magnification is small and FIG. 1B illustrates an image photographed when the magnification is larger.

When hand trembling and motion of an object occur at the same time, the motion of the object can be found in an object area 103 illustrated in FIG. 1A.

In this case, motion due to hand trembling also appears in an area outside the object image area 103.

However, if the zoom magnification becomes larger as illustrated in FIG. 1B, the object image area 104 becomes relatively larger with respect to the whole area 102.

Accordingly, the motion of the object has a frequency less than that of the camera intended by a user manipulating the camera, but with the increasing zoom magnification, the motion of the object becomes an increasing portion of the whole image.

As a result, if the zoom magnification increases, the motion of the object increasingly affects the whole image, thereby causing a problem in selecting a global motion vector due to hand trembling.

SUMMARY OF THE INVENTION

The present invention provides an apparatus for and method of estimating a motion due to hand trembling, wherein a global motion due to hand trembling can be accurately estimated by setting a weight value for a motion vector of each of a plurality of image blocks in an image pickup device such as a camera and a camcorder according to zoom magnification information and focus information.

The present invention also provides an image pickup device using the apparatus for and method of estimating a motion due to hand trembling.

According to an aspect of the present invention, there is provided a method of estimating a motion due to hand trembling in an image pickup device, the method including: dividing a photographed image into a plurality of image blocks; determining a weight value for a motion vector of each image block based on focus information and zoom magnification information; predicting a motion vector for each image block; and determining a global motion vector due to the hand trembling by applying the weight value determined for the motion vector for each image block to the predicted motion vector.

According to another aspect of the present invention, there is provided an apparatus for estimating a motion due to hand trembling in an image pickup device, the apparatus including: a block weight value setting unit which determines a different weight value for a motion vector of each of a plurality of image blocks according to focus information and zoom magnification information; a motion estimation unit which estimates a motion vector of each image block obtained by dividing a photographed image; and a global motion detection unit which determines a global motion vector due to hand trembling by applying the determined weight value for the motion vector for each image block to the motion vector estimated in the motion estimation unit.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1A:
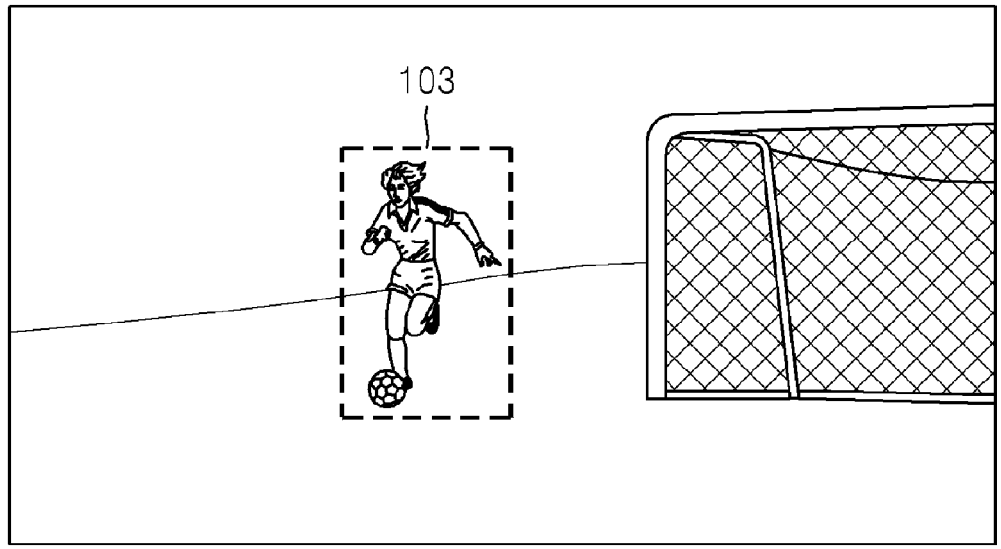
FIGS. 1A and 1B are diagrams illustrating image screens photographed with different zoom magnifications according to the related art.
Figure 1B:
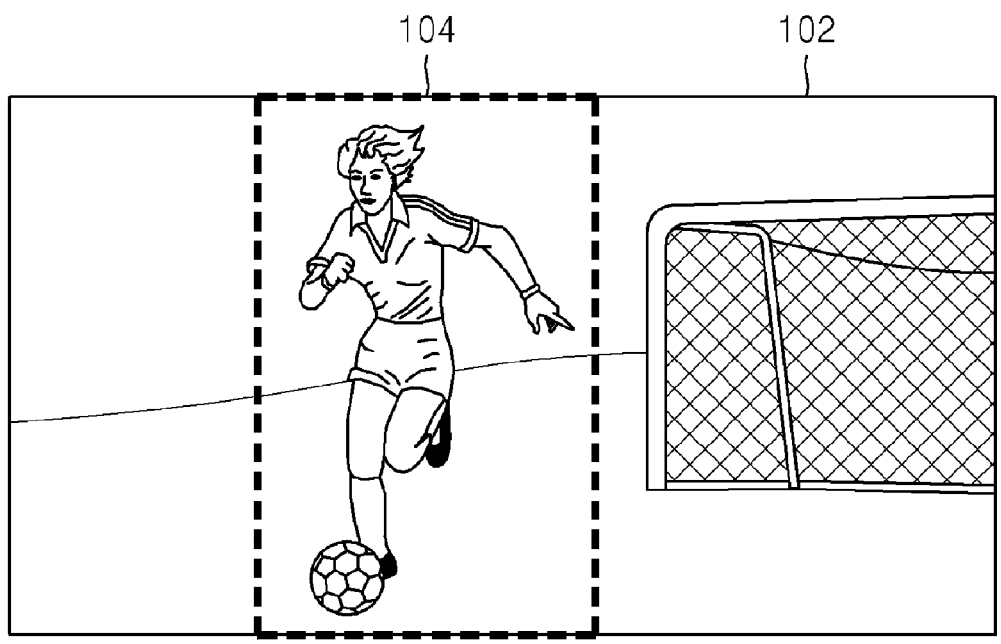
Figure 2:
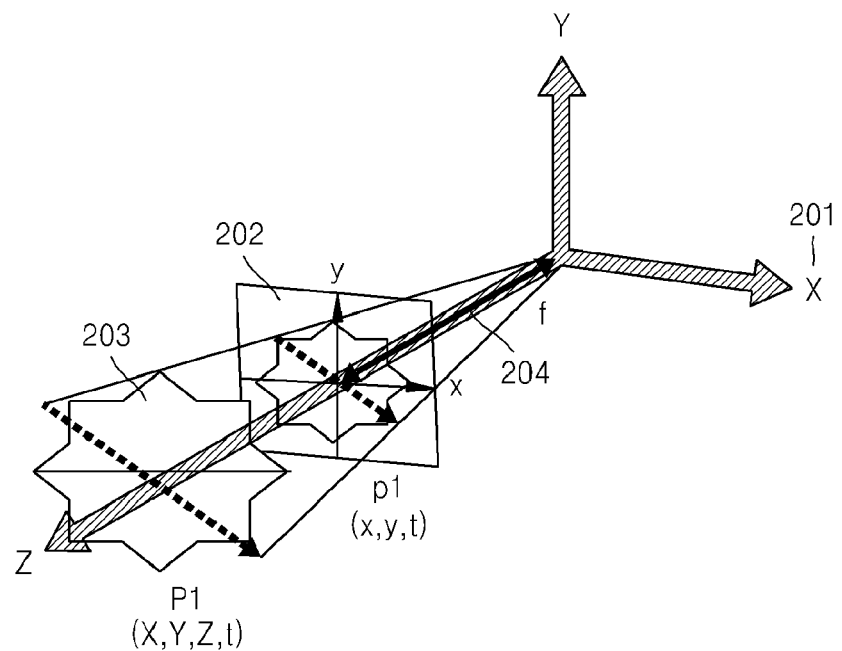
FIG. 2 is a diagram illustrating a 3D world coordinate system for explaining ordinary photographed image information according to the related art.

FIG. 2 is a diagram illustrating a three-dimensional (3D) world coordinate system for explaining ordinary photographed image information according to the related art.

When a motion in a 3D world is projected on a two-dimensional (2D) image plane, the zoom magnifications provided by a zoom function in an image pickup device have a linear relationship with the magnitude of an object on the image plane.

FIG. 2 illustrates image information on images formed on the image plane 202 of an object 203 in a 3D world coordinate system.

The zoom effect is indicated by reference number 204. The zoom effect can be expressed using equation 1 below according to changes in the zoom magnifications:

$$f:Z = x:X \\ f:Z = y:Y \\ x = \frac{X*f}{Z} \\ y = \frac{Y*f}{Z}$$ (1)

where, Z is depth information of an object in the 3D space, and f is zoom information.

According to equation 1, the position (x,y) at which the image of the object is formed on the image plane has a linear relationship with the zoom information f.

Accordingly, due to this linear relationship, a problem arises in estimating a global motion vector.

Figure 3A:
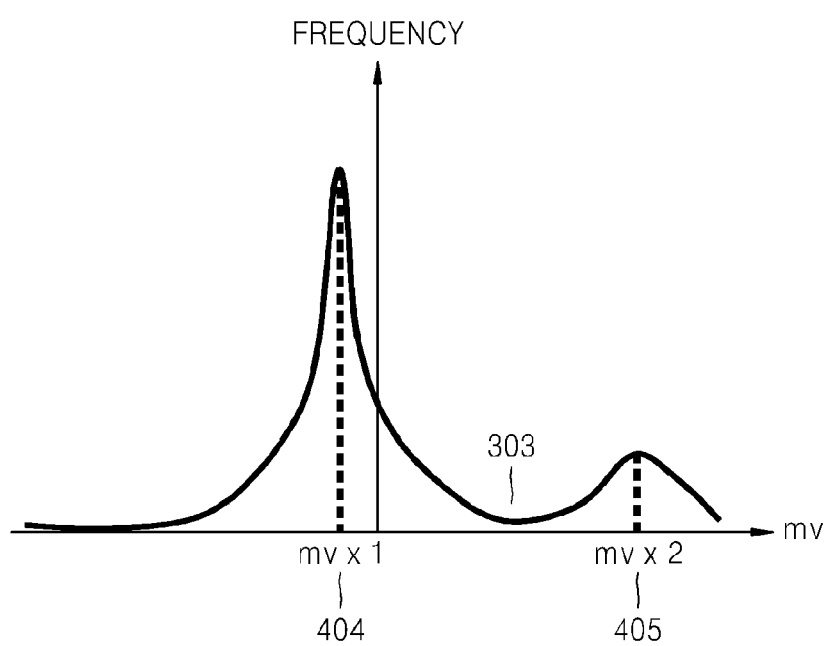
FIG. 3A is a graph illustrating the frequencies of motion vectors occurring when hand trembling occurs in photographing an image with an image pick device according to the related art.
Figure 3B:
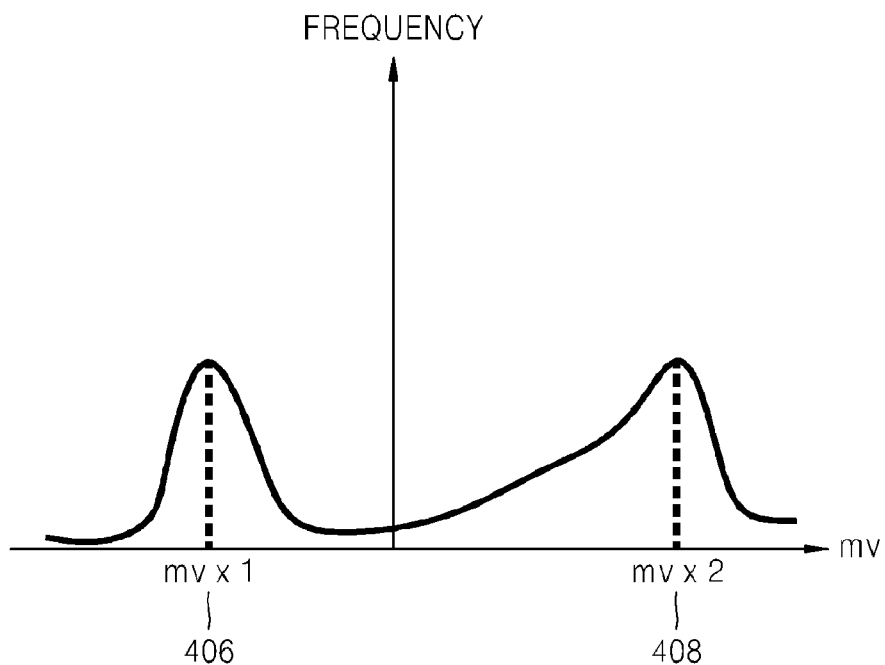
FIG. 3B is a graph illustrating the frequencies of motion vectors occurring when the zoom magnification in an image pickup device is set to be large according to the related art.

FIG. 3A is a graph illustrating the frequencies of motion vectors occurring when hand trembling occurs in photographing an image with an image pick device. FIG. 3B is a graph illustrating the frequencies of motion vectors occurring when the zoom magnification in an image pickup device is set to be large.

Referring to FIG. 3A, x coordinates indicate the magnitude values of motion vectors (mv), and y coordinates indicate frequencies of motion vectors. Reference number 303 indicates the magnitude distribution of a motion vector in each block unit after the motion of the block is estimated. The magnitude distribution of the motion vectors illustrated in FIG. 3A shows that one big peak value and another small peak value exist above the X-axis. In this case, a motion due to hand trembling affects the whole area of the image. Accordingly, it can be determined that $mv_{x1}$ 404 having the big peak is a motion vector due to hand trembling and $mv_{x2}$ 405 having the small peak is a motion vector due to object motion.

However, if the zoom magnification is enlarged or if objects do not exist in at the same depth, the portion of the object in the whole image increases. Accordingly, when images are photographed, two peaks occur above the X-axis as illustrated in FIG. 3B. Accordingly, it is difficult to determine which peak is a motion vector due to hand trembling motion between the two peaks $mv_{x1}$ 406 and $mv_{x2}$ 408.

Figure 4:
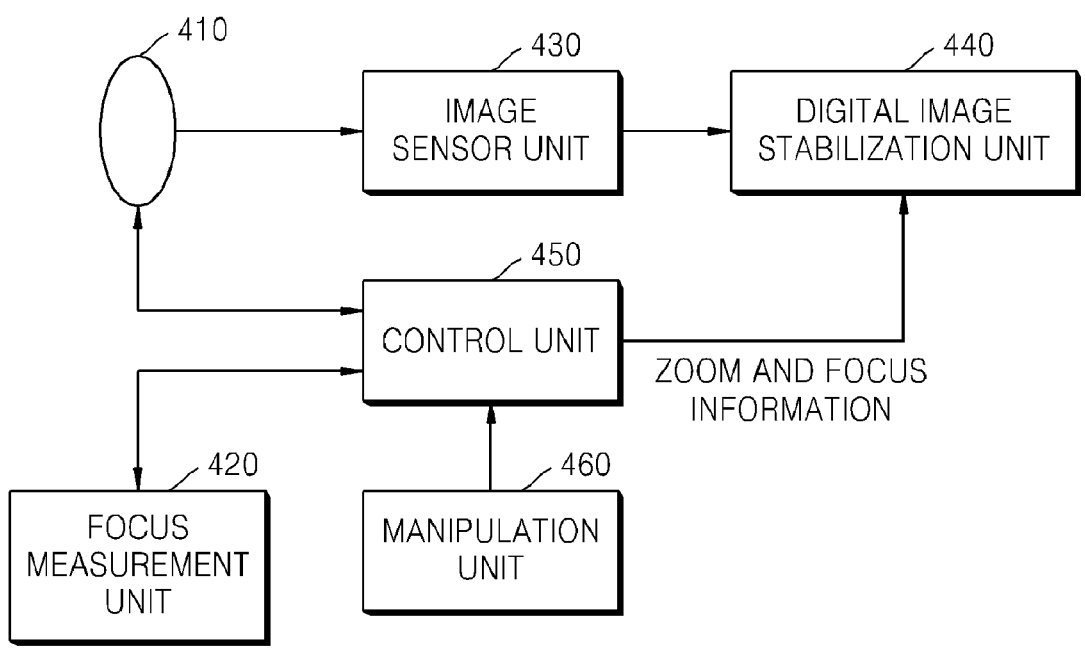
FIG. 4 is a block diagram of an image pickup device according to an exemplary embodiment of the present invention.

FIG. 4 is a block diagram of an image pickup device according to an exemplary embodiment of the present invention.

Referring to FIG. 4, the image pickup device includes a photographing lens unit 410, a focus measurement unit 420, an image sensor unit 430, a digital image stabilization unit 440, a control unit 450, and a manipulation unit 460.

The photographing lens unit 410 includes an optical lens module and forms an image of an object desired to be photographed on an incident surface of the image sensor unit 430.

The image sensor unit 430, which may be a charge-coupled device (CCD) or complimentary metal-oxide semiconductor (CMOS) type, picks up an object image formed on the incident surface and converts the image into a red, green, and blue (RGB) signal.

The manipulation unit 460 receives an input of a manipulation command related to selection of a function and control from an operation from an operator. In particular, the manipulation unit 460 receives a zoom change command from the operator manipulating the device and provides the command to the control unit 460.

The focus measurement unit 420 measures the focused position in areas in a photographed image by using a known technology, and provides the result to the control unit 420. For example, the focus measurement unit 420 determines focus information by using the high frequency component of a photographed image.

The control unit 450 receives zoom change information from the operator through the manipulation unit 460, adjusts the zoom magnification and focus of the photographing lens unit 410, and receives focus information from the focus measurement unit 420. In an exemplary embodiment of the present invention, when a predetermined object is photographed by manipulating an optical zoom function, the control unit 450 may transfer to the digital image stabilization unit 440 information on the zoom magnification applied to the photographing lens unit 410. Also, the control unit 450 provides the digital image stabilization unit 440 with information on the focusing position of the image.

The digital image stabilization unit 440 detects global motion vectors from a hand trembling image input from the image sensor unit 430, and accumulates the global motion vectors, thereby obtaining a stabilized image. In particular, the digital image stabilization unit 440 determines a weight of a motion vector for each block unit according to the zoom magnification and focus information from the control unit 450, and extracts global motion due to hand trembling motion based on the weight of the motion vector for each block unit.

Figure 5:
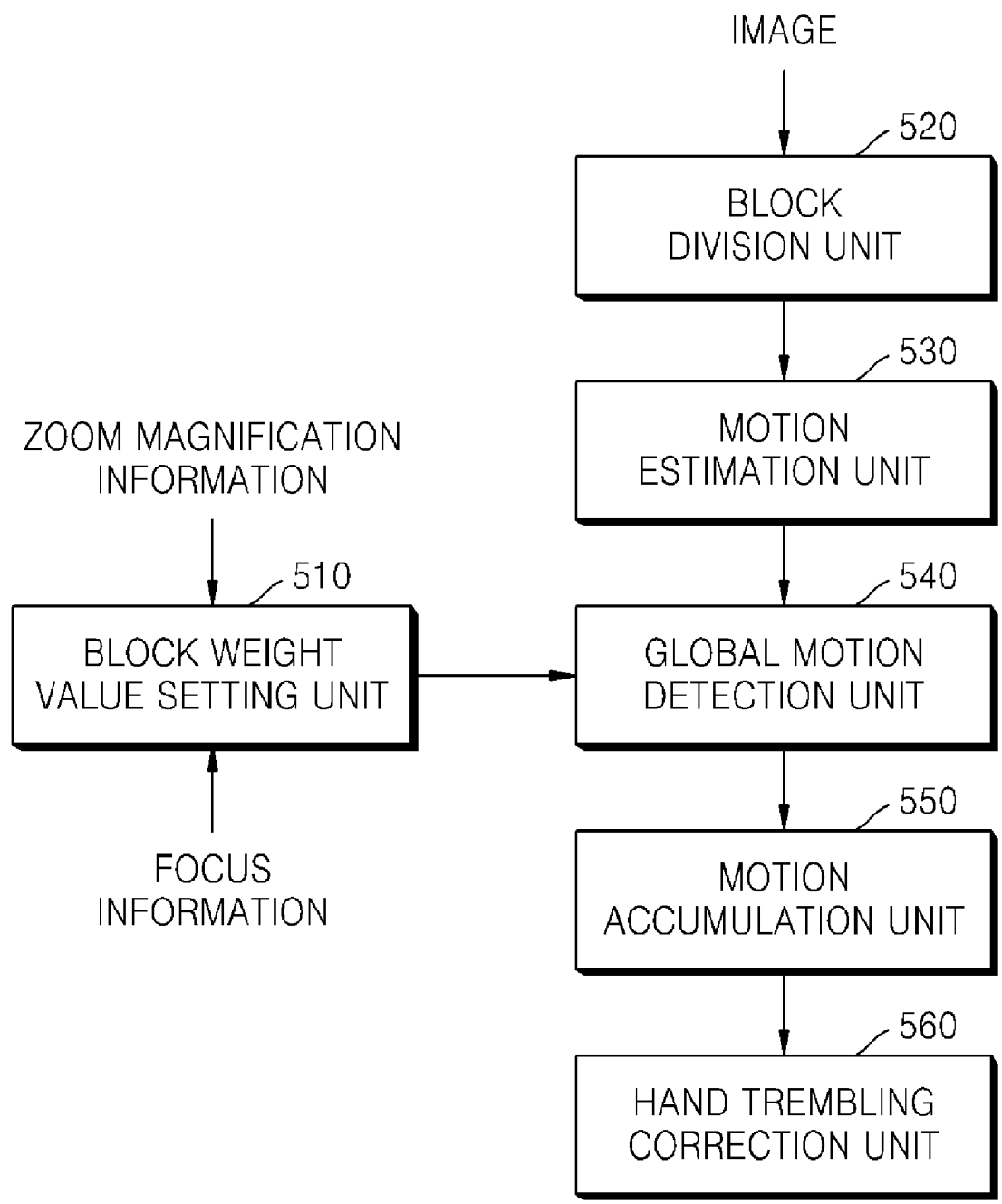
FIG. 5 is a detailed diagram of a digital image stabilization unit illustrated in FIG. 4 according to an exemplary embodiment of the present invention.

FIG. 5 is a detailed diagram of the digital image stabilization unit 440 illustrated in FIG. 4 according to an exemplary embodiment of the present invention.

Referring to FIG. 5, the digital image stabilization unit includes a block weight value setting unit 510, a block division unit 520, a motion estimation unit 530, a global motion detection unit 540, a motion vector accumulation unit 550, and a hand trembling correction unit 560.

The block weight setting unit 510 determines a weight value for a motion vector, which may be different for each block or area, by using focus information and zoom magnification information. That is, the block weight setting unit 510 determines a weight function of a motion vector which is preset based on focus information, and changes the slope of the weight function of the motion vector relative to zoom magnification information. In this case, the weight function of the motion vector may be set as a one-dimensional (1D) linear function or a 2D linear function. Also, the weight value for a motion vector of each block according to zoom magnification or focus information may be stored in advance as a look-up table. Also, a variety of method of calculation of a motion vector in each block may be used.

The block division unit 520 divides a photographed image signal into predetermined block or area units.

The motion estimation unit 530 estimates a motion vector of each block unit, obtained by dividing the image in the block division unit 520, by using a block matching algorithm. For example, the motion estimation unit 530 may estimate a motion vector of each block by calculating the difference between a block of a reference frame (or a previous frame) and a block of a current frame by using a temporal correlation between neighboring frames.

The global motion detection unit 540 searches for a global motion of an image in order to correct an image in which hand trembling motion occurs over time. Accordingly, the global motion detection unit 540 applies the weight value of a motion vector for each block unit determined the block weight value setting unit 510 to the motion vector of each block estimated in the motion estimation unit 530, thereby detecting a global motion vector due to hand trembling motion.

The motion accumulation unit 550 accumulates the global motion vectors detected in the global motion detection unit 540.

The hand trembling correction unit 560 corrects the position of a frame in order to compensate for hand trembling motion by using the global motion vectors accumulated in the motion accumulation unit 550.

Figure 6:
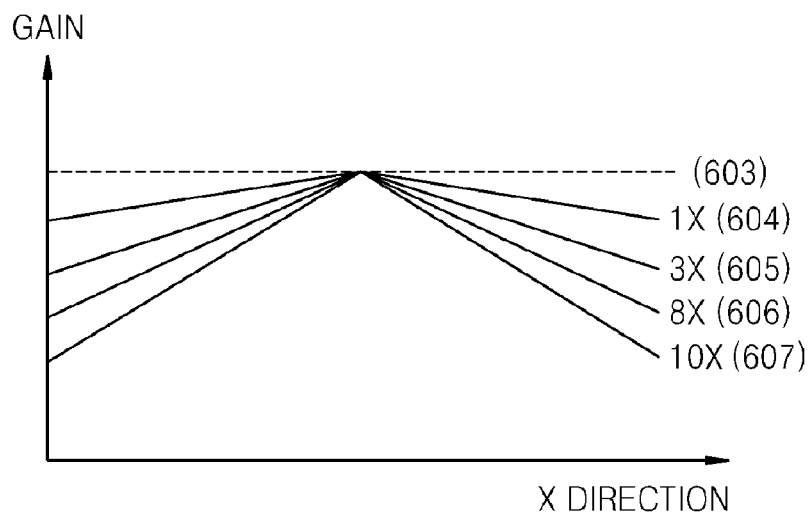
FIG. 6 is a diagram illustrating a weight function of a motion vector for each block unit with respect to zoom magnifications according to an exemplary embodiment of the present invention.

FIG. 6 is a diagram illustrating a weight function of a motion vector for each block unit with respect to zoom magnifications according to an exemplary embodiment of the present invention.

Referring to FIG. 6, x coordinates indicate image space positions in the x direction, and y coordinates indicate weight values of motion vectors. Reference number 603 indicates a weight function when no zoom magnification exists, or when a small zoom magnification exists. Reference numbers 604, 605, 606, and 607 indicate motion vector weight functions corresponding to when the zoom magnification is 1×, 3×, 8×, and 10×, respectively. As the zoom magnification increases from 1×, to 3×, 8×, and 10×, the weight function of a motion vector set in the image in units of blocks also changes in order to reduce the effect of the motion of an object. Accordingly, by determining a different weight value for a motion vector in each block according to the zoom magnifications, as illustrated in FIG. 6, estimation of a motion for each block according to zoom information can be adaptively performed. In this case, the weight values for motion vectors different from each other with respect to zoom magnifications may be stored as a look-up table.

Figure 7A:
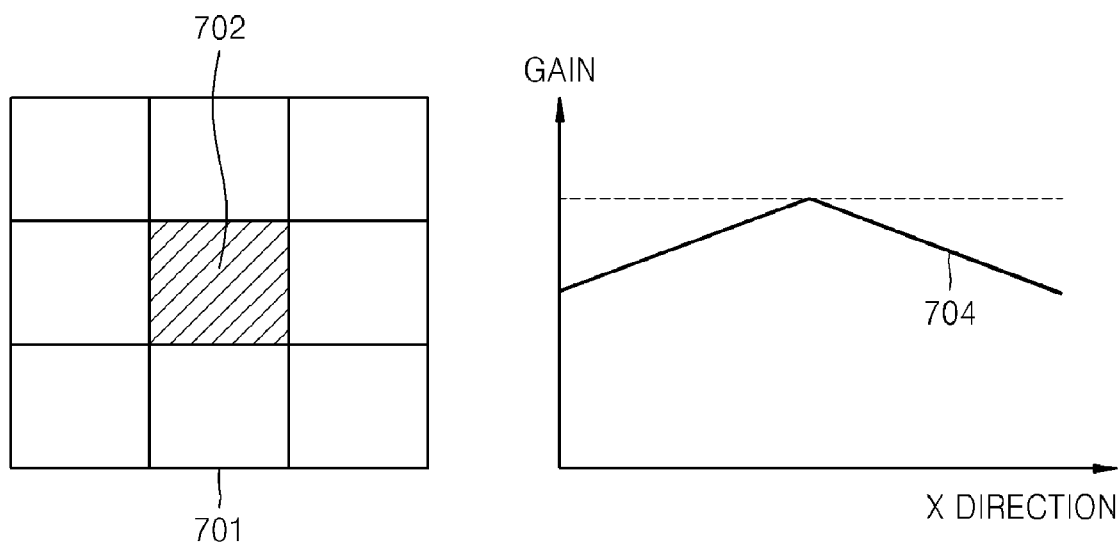
FIGS. 7A and 7B are diagrams illustrating changes in a weight function of a motion vector based on focus information according to an exemplary embodiment of the present invention.
Figure 7B:
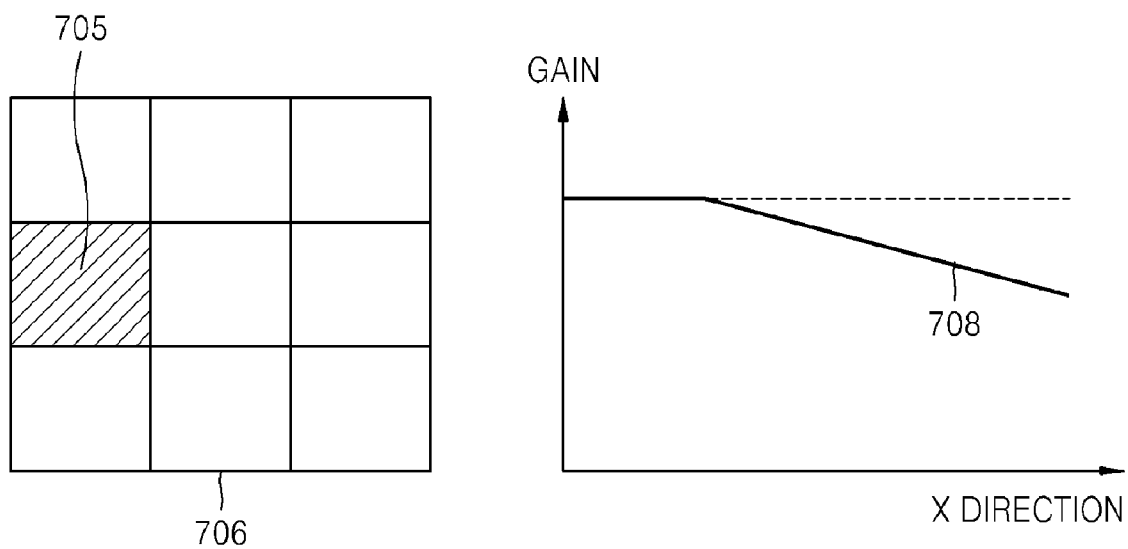

FIGS. 7A and 7B are diagrams illustrating changes in a weight function of a motion vector based on focus information according to an exemplary embodiment of the present invention.

FIGS. 7A and 7B illustrate an embodiment in which a larger weight is set for a motion vector detected in a focused area. The weight values for motion vectors different from each other according to focus information may be stored as a look-up table.

Referring to FIG. 7A, reference number 701 indicates the whole area of an image, and 702 indicates a focused area. Accordingly, when a predetermined object is photographed, an image pickup device selects a weight function 704 which puts a larger weight value on a motion vector detected in the focused central area.

Accordingly, an object image is detected from the whole image and weight values for the motion vectors of the object and the background are determined.

Referring to FIG. 7B, reference number 706 indicates the whole area of an image and 705 indicates a focused area. Accordingly, when a predetermined object is photographed, an image pickup device selects a weight value 708 which puts a larger weight value on a motion vector detected in the focused side area.

Accordingly, in the side area of an image having much motion information due to hand trembling, a relatively larger weight value is set when the zoom magnification increases, and thus, even though the portion of an object in the whole image increases, the global motion vector due to hand trembling can be accurately estimated.

Figure 8:
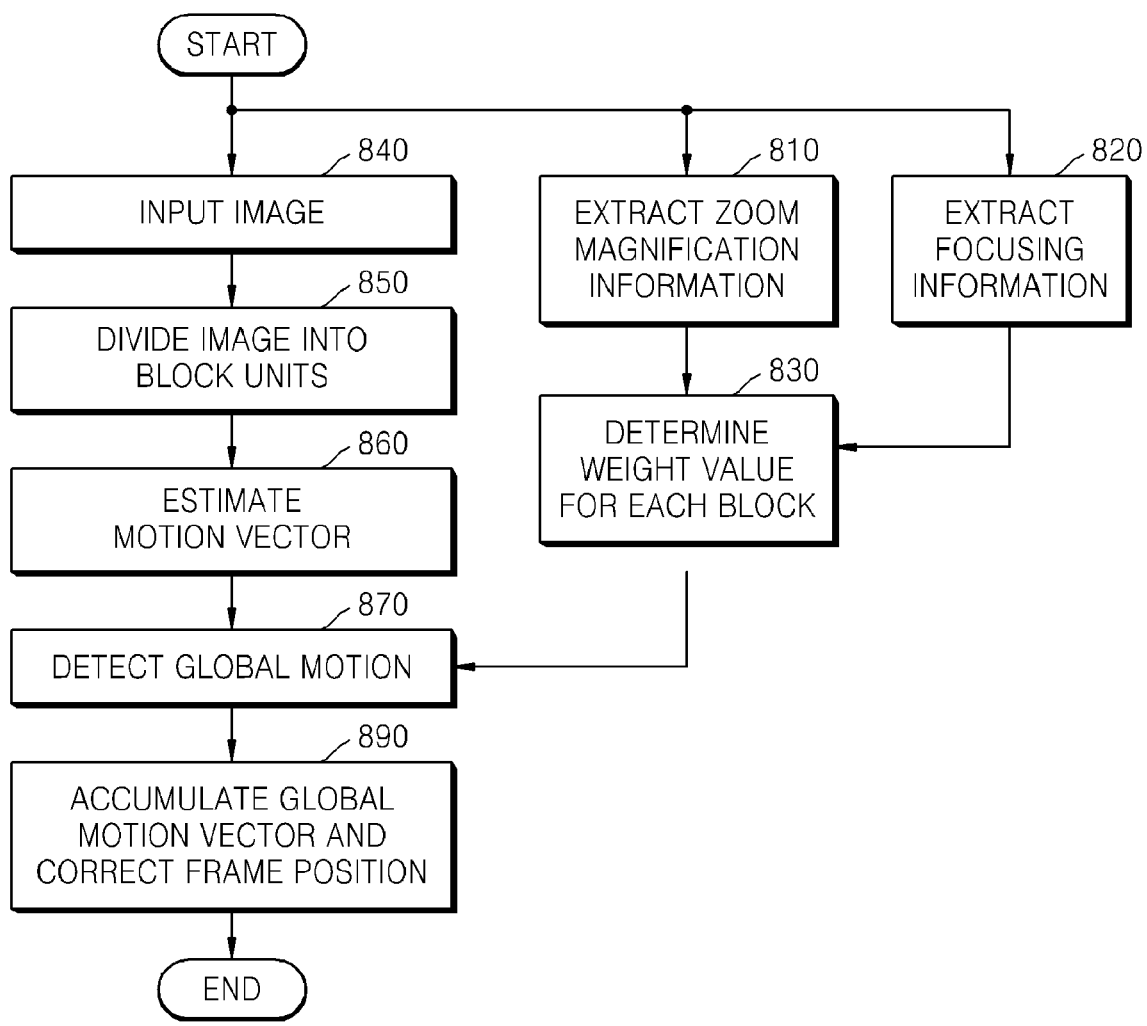
FIG. 8 is a flowchart illustrating a method of estimating a motion due to hand trembling according to an exemplary embodiment of the present invention.

FIG. 8 is a flowchart illustrating a method of estimating a motion due to hand trembling according to an exemplary embodiment of the present invention.

First, when a predetermined object is photographed by manipulating an optical zoom function, the manipulated zoom magnification information is extracted in operation 810.

Also, focus information indicating which position in the image is focused is extracted in operation 820.

Then, by using the focus information and zoom magnification information, a weight value for a motion vector, which is different for each block or area, is determined in operation 830. In this case, changes in the magnitude of the vector should be based on the zoom magnifications. Also, a motion vector at the focused position should be employed.

In an exemplary embodiment of the present invention, in order to apply a motion vector to a photographed image, a weight function of a motion vector preset based on focus information is determined, and then, the slope of the weight function of a motion vector is changed based on zoom magnification information.

If a photographed image is input in operation 840, the image is divided into blocks or areas of a predetermined size in operation 850.

Then, by using a block matching algorithm, a motion vector of each block obtained by the division is estimated in operation 860. In a frame matching algorithm, a current image and a previous image are divided into smaller blocks of a predetermined size, and a motion of each block is estimated, thereby obtaining motion vectors.

Then, by adding a weight value for a motion vector, different in each block, to the estimated motion vector of the block, the global motion is detected in operation 870. For example, a histogram may be generated by using the frequencies of motion vectors for respective blocks to which weight values are added, and a motion vector having the highest frequency in the histogram may be estimated as a global motion vector.

Then, by accumulating global motion vectors, the position of a frame is adjusted, thereby correcting the hand trembling effect on the image in operation 890.

According to exemplary embodiments of the present invention, a motion due to hand trembling and an object motion vary with respect to focus information and zoom magnifications. Accordingly, in an image pickup device such as a camera and a camcorder, by determining a weight for a motion vector of each block according to zoom magnification and focus information, the motion due to hand trembling can be accurately estimated. Also, by adaptively finding a motion vector according to zoom magnifications, the influence of the object motion can be minimized when a global motion vector is estimated.

Exemplary embodiments of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of estimating a motion in an image pickup device, the method comprising:
    dividing by the image pickup device, a photographed image into a plurality of image blocks;
    determining a weight value for a motion vector of each image block of the plurality of image blocks based on focus information and zoom magnification information;
    predicting the motion vector for each image block of the plurality of image blocks; and
    determining a global motion vector by applying, for each of the plurality of image blocks, the weight value determined for the motion vector for each image block of the plurality of image blocks to the corresponding predicted motion vector,
    wherein the determining the weight value comprises determining a weight function having a slope for the motion vector based on the focus information, and changing the slope of the weight function based on the zoom magnification information.

2. The method of claim 1, wherein the weight function of the motion vector is one of a one-dimensional function and a two-dimensional function.

3. The method of claim 1, wherein the determining the weight value for the motion vector of each image block comprises assigning a weight value to a motion vector detected in a focused area which is larger than a weight value assigned to a motion vector outside the focused area.

4. The method of claim 1, wherein the determining the weight value for the motion vector of each image block comprises detecting an object area in the image and determining the weight values of the object and the background.

5. The method of claim 1, wherein the determining the weight value for the motion vector of each image block comprises setting a different weight value for the motion vector in each image block of the plurality of image blocks according to the zoom magnification information.

6. The method of claim 1, wherein the determining the weight value for the motion vector of each image block comprises setting a different weight value for the motion vector in each image block of the plurality of image blocks according to the focus information.

7. The method of claim 1, wherein the determining the global motion vector comprises calculating a frequency of the motion vector for each image block of the plurality of image blocks to which the weight value is added, and determining a motion vector having the highest frequency as the global motion vector.

8. The method of claim 1, further comprising storing, in a look-up table, the weight value for the motion vector of each image block of the plurality of image blocks according to the zoom magnification information.

9. The method of claim 1, further comprising storing, in a look-up table, the weight value for the motion vector of each image block of the plurality of image blocks according to the focus information.

10. An apparatus for estimating a motion in an image pickup device, the apparatus comprising:
    a block weight value setting unit which determines a different weight value for a motion vector of each of a plurality of image blocks according to focus information and zoom magnification information;
    a motion estimation unit which estimates the motion vector of each image block of the plurality of image blocks obtained by dividing a photographed image; and
    a global motion detection unit which determines a global motion vector by applying, for each of the plurality of image blocks, the determined weight value for the motion vector for each image block of the plurality of image blocks to the corresponding estimated motion vector,
    wherein the block weight value setting unit determines a weight function having a slope for the motion vector based on the focus information and changes the slope of the weight function based on the zoom magnification information.

11. The apparatus of claim 10, wherein the block weight value setting unit comprises a look-up table which stores different weight values for motion vectors in each image block of the plurality of image blocks according to zoom magnification information and focus information.

12. An image pickup device comprising:
    an image sensor unit which generates an image signal;
    a control unit which receives zoom change information from a manipulator and outputs zoom magnification information and focus information of an optical lens module;
    an image stabilization unit which determines a weight of a motion vector for each of a plurality of image blocks of the image signal according to the zoom magnification information and the focus information from the control unit, and determines a global motion vector of the image signal generated in the sensor unit by applying, for each of the plurality of image blocks, the determined weight of the motion vector for each image block of the plurality of image blocks to a corresponding estimated motion vector for each image block of the plurality of image blocks,
    wherein the image stabilization unit determines a weight function having a slope for the motion vector based on the focus information and changes the slope of the weight function based on the zoom magnification information.

13. The device of claim 12, wherein the image stabilization unit comprises:
    a block weight value setting unit which determines a different weight value for a motion vector of each image block of the plurality of image blocks according to the focus information and the zoom magnification information;

a motion estimation unit which estimates a motion vector of each image block of the plurality image blocks obtained by dividing a photographed image;

a global motion determination unit which determines the global motion vector by applying the determined weight value for the motion vector for each image block of the plurality image blocks to the motion vector estimated in the motion estimation unit; and a hand trembling correction unit which compensates for hand trembling based on the global motion vector.

14. A method of estimating a motion in an image pickup device, the method comprising:

dividing by the image pickup device, a photographed image into a plurality of image blocks;

determining weight values for the plurality of image blocks based on focus information and zoom magnification information;

predicting motion vectors for the plurality of image blocks; and applying the determined weight values to the predicted motion vectors to determine a global motion vector based on histogram information, wherein the determining the weight values comprises determining a weight function having a slope for the plurality of image blocks based on the focus information and changing the slope of the weight function based on the zoom magnification information.

15. The method of claim 14, wherein one of the motion vectors to which the weight values have been applied, having a highest frequency in the histogram information is determined as the global motion vector.

* * * * *